(12) United States Patent
Hong (10) Patent No.: US 9,203,255 B2
(45) Date of Patent: Dec. 1, 2015

(54) CONTROL METHOD FOR ELECTRIC VEHICLE

(75) Inventor: Jun Hyeon Hong, Incheon-si (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 14/009,822

(22) PCT Filed: Apr. 6, 2012

(86) PCT No.: PCT/KR2012/002628
§ 371 (c)(1),
(2), (4) Date: Oct. 17, 2013

(87) PCT Pub. No.: WO2012/138174
PCT Pub. Date: Oct. 11, 2012

(65) Prior Publication Data
US 2014/0035537 A1    Feb. 6, 2014

(30) Foreign Application Priority Data

Apr. 7, 2011    (KR) .................. 10-2011-0032222

(51) Int. Cl.
*H01M 10/44* (2006.01)
*H01M 10/46* (2006.01)
(Continued)

(52) U.S. Cl.
CPC ............. *H02J 7/0052* (2013.01); *B60L 3/0046* (2013.01); *B60L 3/04* (2013.01); *B60L 3/12* (2013.01); *B60L 7/14* (2013.01); *B60L 11/1803* (2013.01); *B60L 11/1861* (2013.01); *B60L 11/1864* (2013.01); *B60L 11/1874* (2013.01); *B60L 11/1879* (2013.01); *B60L 15/2009* (2013.01);
(Continued)

(58) Field of Classification Search
CPC ....... H02J 7/0073; H02J 7/041; H02J 7/0091; H02J 7/04; H02J 7/047; H01M 10/443; H01M 10/44; H01M 10/46
USPC .................. 320/104, 116, 132, 150, 153, 162
See application file for complete search history.

(56) References Cited

U.S. PATENT DOCUMENTS

2010/0231226 A1* 9/2010 Yamashita et al. ............ 324/433
2011/0199053 A1* 8/2011 Minamiura ......... H01M 10/441
320/136
2011/0267000 A1* 11/2011 Horie ............................ 320/107

FOREIGN PATENT DOCUMENTS

CN    201499004 U    *    6/2010
JP    07031072 A    *    1/1995

(Continued)

OTHER PUBLICATIONS

International Search Report dated Oct. 23, 2012 for Application No. PCT/KR2012/002628 with English Translation, 4 pages.

*Primary Examiner* — Edward Tso
(74) *Attorney, Agent, or Firm* — Fish & Richardson P.C.

(57) ABSTRACT

The present invention provides a control method for an electric vehicle, comprising the steps of: measuring a current voltage of a battery cell module and an external temperature immediately before or after a start of charging; determining whether or not charging has been completed by measuring a charging voltage of the battery cell module after charging during a predetermined time set according to at least one of the current voltages and the external temperature; and calculating a voltage variation on the basis of the current voltage and the charging voltage if it is determined that charging has been completed, and determining whether the battery cell module is normal or abnormal on the basis of the voltage variation and a set reference voltage variation.

20 Claims, 8 Drawing Sheets

(51) Int. Cl.
*H02J 7/00* (2006.01)
*B60L 3/00* (2006.01)
*B60L 3/04* (2006.01)
*B60L 3/12* (2006.01)
*B60L 7/14* (2006.01)
*B60L 11/18* (2006.01)
*B60L 15/20* (2006.01)

(52) U.S. Cl.
CPC .......... *B60L 2240/12* (2013.01); *B60L 2240/36* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2240/662* (2013.01); *B60L 2240/80* (2013.01); *B60L 2250/10* (2013.01); *B60L 2250/12* (2013.01); *B60L 2250/16* (2013.01); *B60L 2270/145* (2013.01)

(56) References Cited

FOREIGN PATENT DOCUMENTS

| JP | 10-084638 A | 3/1998 |
| JP | 2000-050507 A | 2/2000 |
| JP | 2003-143703 A | 5/2003 |
| JP | 2011-054413 A | 3/2011 |

* cited by examiner

| EXTERNAL TEMPERATURE | CURRENT VOLTAGE | RECHARGING VOLTAGE | PREDTERMINED TIME | REFERENCE DEGREE OF VOLTAGE VARIATION | NORMAL |
|---|---|---|---|---|---|
| -10 ℃ | 5V | 20V | 2h | Δ15 | NORMAL |
|  | 7V | 20V | 1.7h | Δ13 | NORMAL |
|  |  |  |  |  |  |
| -0 ℃ | 5V | 20V | 1.5h | Δ15 | NORMAL |
|  | 7V | 20V | 1.3h | Δ13 | NORMAL |
|  |  |  | ⋮ |  |  |
| 10 ℃ | 5V | 20V | 1.4h | Δ15 | NORMAL |
|  | 7V | 20V | 1.2h | Δ13 | NORMAL |
|  |  |  | ⋮ |  |  |
| 26 ℃ | 5V | 20V | 1.3h | Δ15 | NORMAL |
|  | 7V | 20V | 1.1h | Δ13 | NORMAL |
|  |  |  | ⋮ |  |  |

FIG. 8

CONTROL METHOD FOR ELECTRIC VEHICLE

CROSS REFERENCE TO RELATED APPLICATIONS

This application is a U.S. National Phase Application under 35 U.S.C. §371 of International Application PCT/KR2012/002628, filed on Apr. 6, 2012, which claims the benefit of Korean Application No. 10-2011-0032222, filed on Apr. 7, 2011, the entire contents of which are hereby incorporated by reference.

TECHNICAL FIELD

The present invention relates to and a control method for an electric vehicle, and more particularly to a control method for an electric vehicle in which battery cell modules can be maintained in an optimum state by determining abnormality of the battery cell module.

BACKGROUND ART

A vehicle is a transportation means that produces power from an engine equipped therein and transfers the power to the wheels to carry passengers and freight on a road. A vehicle is generally divided into a body forming the external appearance of the vehicle, and a chassis that organically connects various devices to each other. The chassis includes an engine of the vehicle, which produces driving force for travel, and main apparatuses such as a power transmission, a steering system, a suspension system, and a brake system.

The engine produces the driving force to move a vehicle. Most vehicles are provided with a four-stroke internal combustion engine. The four-stroke internal combustion engine, which completes one cycle consisting of four strokes of intake, compression, combustion, and exhaust, is the most common example of a reciprocating engine. Internal combustion engines, which mainly use a volatile fuel, obtain kinetic energy using thermal energy which is generated when the fuel mixed with the oxygen in the air to allow complete combustion is compressed and combusted.

Such internal combustion engines using a volatile fuel cause environmental pollution due to exhaust gas and the depletion of petroleum resources. As an alternative, electric vehicles powered by electricity have emerged.

Electric vehicles (EVs) are mainly powered by driving an AC or DC motor using the power from a battery. The EVs are generally classified into battery-only EVs and hybrid EVs. Battery-only EVs drive a motor using power from a battery, which is recharged once remaining battery charge approaches a lower limit. Hybrid EVs can recharge a battery by operating an engine and generating electricity and move by driving the electric motor using this electricity.

Hybrid EVs can further be classified into a serial type and a parallel type. Serial type hybrid EVs are vehicles that are always driven by a motor by converting mechanical energy output from an engine into electric energy through a generator and supplying this electric energy to a battery or the motor. The serial type hybrid EVs are configured by adding an engine and a generator to conventional EVs to increase range. Parallel type hybrid EVs can be driven by power from two power sources, i.e., can be driven either by power from a battery or by an engine (a gasoline engine or a diesel engine). Parallel type hybrid EVs can be driven by both an engine and a motor depending upon travel conditions.

Therefore, EVs powered by batteries alone and hybrid electric vehicles (HEVs), which use a battery and an existing combustion engine battery together, have been developed. Some EVs and HEVs are already commercially available. As a secondary battery serving as a power source of the EVs and HEVs, a nickel metal hydride (Ni-MH) cell is mainly used, but in recent years, use of lithium-ion cells has also been implemented.

In order to be used as a power source of EVs and HEVs, high power and high capacity is required. Accordingly, a medium scale or large-scale battery pack formed by connecting a large number of small secondary batteries (unit cells) in series and/or in parallel is used.

As a unit cell constituting medium scale or large-scale battery pack, a prismatic battery or a pouch cell, which can be stacked at high density to reduce dead space, is used. To facilitate electrical connection and mechanically fastening of such unit cells, a cell cartridge on which one or more unit cells can be mounted is used. That is, the battery pack is configured by stacking a plurality of battery cell modules having unit cells mounted thereon.

In recent years, research into battery management systems (BMSs) to determine the time to replace battery cell modules of an EV through recharging voltages of the battery cell modules is underway.

DISCLOSURE

Technical Problem

Therefore, the present invention has been made in view of the above problems, and it is an object of the present invention to provide a control method for an electric vehicle in which battery cell modules can be maintained in an optimum state by determining abnormality of the battery cell modules.

Technical Solution

In accordance with an aspect of the present invention, the above and other objects can be accomplished by the provision of a control method for an electric vehicle including the steps of measuring a current voltage of a battery cell module and an external temperature immediately before or after a start of recharging of the battery cell module, determining whether recharging is completed by measuring a recharge voltage of the battery cell module after recharging is performed for a predetermined time set by at least one of the current voltage and the external temperature, and calculating, when it is determined that recharging is completed, a degree of voltage variation based on the current voltage and the recharging voltage, and determining whether or not the battery cell module is abnormal based on the degree of voltage variation and a set reference degree of voltage variation.

Advantageous Effects

With a control method for an electric vehicle according to the present invention, whether or not a battery cell module is abnormal can be determined based on the degree of voltage variation according to the current voltage, recharging voltage and external temperature by measuring the current voltage and external temperature immediately before or after the start of recharging of the battery cell module and determining whether or not recharging is completed through measurement of the recharging voltage after lapse of a predetermined time from initiation of recharging of the battery cell module.

In addition, a determination as to whether or not a battery cell module is abnormal is externally informed such that the user can check the time for replacement of the battery cell module. Therefore, user safety and cost savings can be secured.

DESCRIPTION OF DRAWINGS

The above and other objects, features and other advantages of the present invention will be more clearly understood from the following detailed description taken in conjunction with the accompanying drawings, in which.

BEST MODE

Reference will now be made in detail to the preferred embodiments of the present invention, examples of which are illustrated in the accompanying drawings.

The advantages and features of the present invention and the methods of achieving the same will become clear from the following detailed description of embodiments and the accompanying drawings. However, the present invention is not limited to the embodiments disclosed below and may be implemented as a variety of different embodiments. The embodiments are presented for complete disclosure of the present invention and to fully communicate the scope of the present invention to those skilled in the art, and the present invention is defined only by the claims and their equivalents. Like reference numerals refer to like elements throughout the specification.

Reference will now be made in detail to the embodiments of the present invention, examples of which are illustrated in the accompanying drawings.

Figure 1:
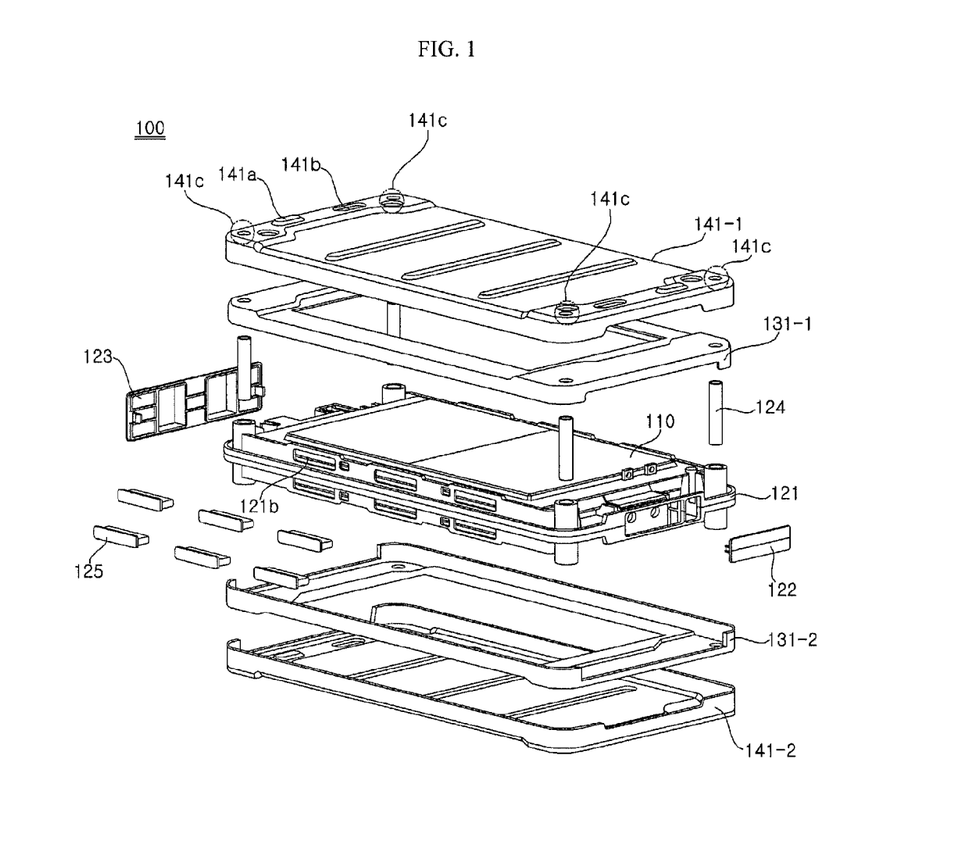
FIG. 1 is an exploded perspective view illustrating a battery cell module according to one embodiment of the present invention.

FIG. 1 is an exploded perspective view illustrating a battery cell module according to one embodiment of the present invention.

Referring to FIG. 1, a battery cell module 100 may include a plurality of unit cells 110, an upper inner cartridge 131-1, a lower inner cartridge 131-2, a center cartridge 121, and a cover 141-1 or 141-2.

The unit cells 110 are nickel metal hydride (Ni-MH) cells or lithium-ion (Li-ion) cells that generate current.

The unit cells 110 are arranged in the center cartridge 121. The upper inner cartridge 131-1 closely contacts the edges of the upper surfaces of the unit cells 110 and the upper cover 141-1 closely contacts the central portions of the upper surfaces of the unit cells 110.

The lower inner cartridge 131-2 closely contacts the edges of the lower surfaces of the unit cells 110, and the lower cover 141-2 closely contacts the central portions of the lower surfaces of the unit cells 110.

The cover 141-1 or 141-2 is one of the upper cover 141-1 or the lower cover 141-2. The upper cover 141-1 is arranged at the upper portion of the battery cell module 100, and the lower cover 141-2 is arranged at the lower portion of the battery cell module 100.

The upper cover 141-1 contacts the upper surface of the unit cells 110 to dissipate heat generated in the unit cells 110. The upper cover 141-1 is preferably formed of aluminum having excellent heat dissipation properties. The upper inner cartridge 131-1 is arranged between the upper cover 141-1 and the unit cells 110.

The upper inner cartridge 131-1 contacts the edges of the upper surfaces of the unit cells 110. The upper inner cartridge 131-1 insulates the unit cells 110 such that the edges of the upper surfaces of the unit cells 110 do not directly contact the upper cover 141-1. The upper inner cartridge 131-1 supports the space between the edges of the upper surfaces of the unit cells 110 and the upper cover 141-1 to protect the edges of the upper surfaces of the unit cells 110.

The lower cover 141-2 is formed in the same manner as the upper cover 141-1. When directly coupled to the lower portion of the battery cell module 100, the upper cover 141-1 becomes the lower cover 141-2. As the upper cover 141-1 and the lower cover 141-2 are identical, the external appearances of the battery cell modules 100 formed thereby are identical to each other, and thus the upper cover 141-1 and the lower cover 141-2 do not need to be separately produced. Thereby, manufacturing costs are and process efficiency is enhanced.

Configurations of the lower cover 141-2 and the lower inner cartridge 131-2 are the same as those of the upper cover 141-1 and the upper inner cartridge 131-1, and therefore a detailed description thereof will be omitted.

Each of the upper cover 141-1 and the lower cover 141-2 is provided with convex portions 141a protruding from the outer surface, and concave portions 141b recessed on the outer surface to be coupled to the convex portions 141a. The convex portions 141a and the concave portions 141b determine the position of the battery cell modules 100 to be coupled to each other when the battery cell modules 100. The convex portions 141a and the concave portions 141b are symmetrically formed at the four corners of the upper surface of the upper cover 141-1 to allow not only forward stacking of the battery cell modules 100 placed to face in the same direction but also reverse stacking of the modules placed to face in the opposite directions.

That is, when the upper cover 141-1 and the lower cover 141-2 are formed in the same manner, and the upper cover 141-1 and the lower cover 141-2 face each other, the convex portions 141a and the concave portions 141b are formed at positions corresponding to each other in order to be coupled to each other. As the convex portions 141a and the concave portions 141b are formed at positions corresponding to each other, in stacking the battery cell modules 100, the lower cover 141-2 of the top battery cell module 100 in the stack is coupled to the upper cover 141-1 of the battery cell module 100 placed immediately below the top battery cell module 100, and the convex portions 141a and the concave portions 141b guide the respective battery cell modules 100 such that the positions of the battery cell modules 100 to be coupled to each other are determined.

Each of the upper cover 141-1 and the lower cover 141-3 is provided with through holes 141c. The through holes 141c allow a long bolt (not shown) to penetrate the battery cell modules 100 when the battery cell modules 100 are stacked and coupled to each other. Once the upper cover 141-1 and the lower cover 141-2 are coupled to the center cartridge 121, the through holes 141c overlap each other to form a path.

The center cartridge 121 is provided with a plurality of unit cells 110. The upper side of the center cartridge 121 and the upper cover 141-1 are coupled to each other with the upper inner cartridge 131-1 placed therebetween. The lower side of the center cartridge 121 and the lower cover 141-2 are coupled to each other with the lower inner cartridge 131-2 placed therebetween. Various coupling techniques, such as bonding, bolt coupling, and welding, may be employed.

The center cartridge 121 is provided with a spacer 124 that supports the upper inner cartridge 131-1 and the lower inner cartridge 131-2, and is penetrated by the long bolt when the battery cell modules 100 are stacked and coupled to each other.

A cartridge support 125 is inserted into a lateral surface hole 121b formed in the center cartridge 121. The cartridge support 125 supports and protects the edges of the unit cells 110.

A front cover 123 is coupled to the front surface of the center cartridge 121, and a rear cover 122 is coupled to the rear surface of the center cartridge 121, in order to protect the unit cells 110.

Figure 2:
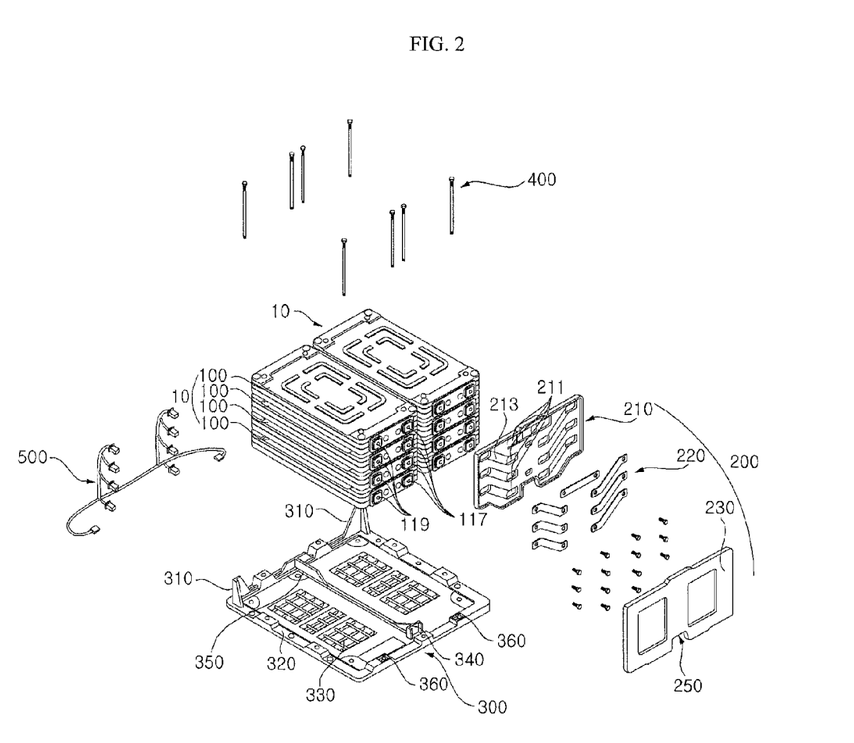
FIG. 2 is an exploded perspective view illustrating a battery pack module including the battery cell module shown in FIG. 1.
Figure 3:
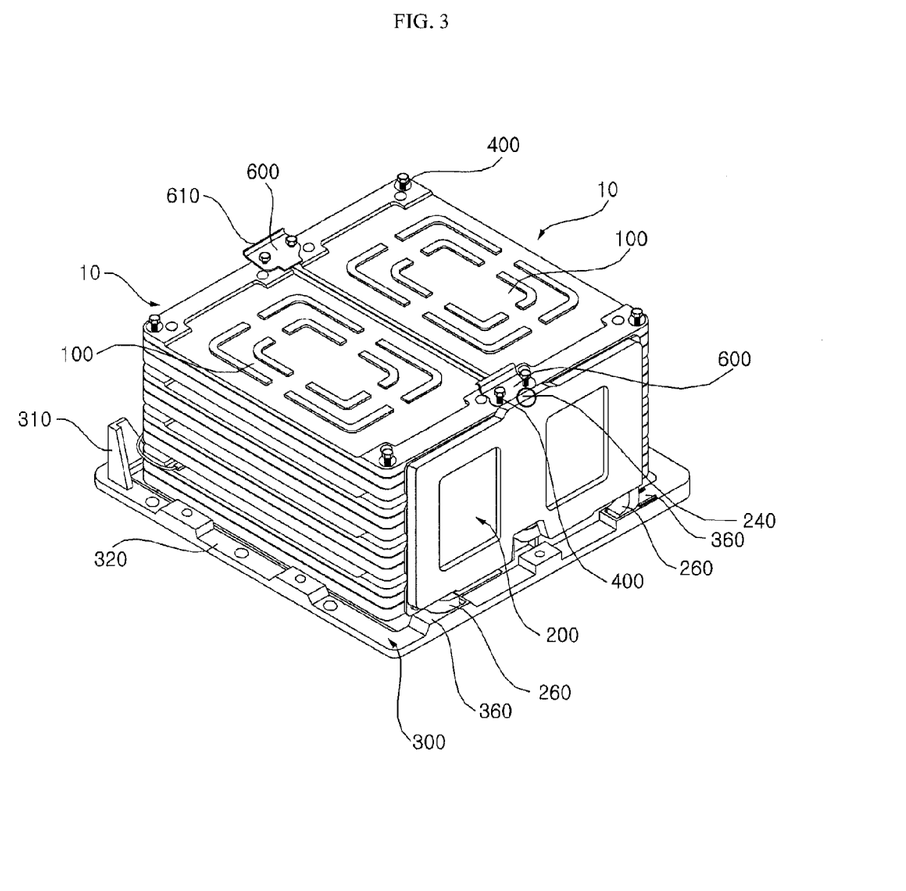
FIG. 3 is a view illustrating the assembled state of the battery pack module shown in FIG. 2.
Figure 4:
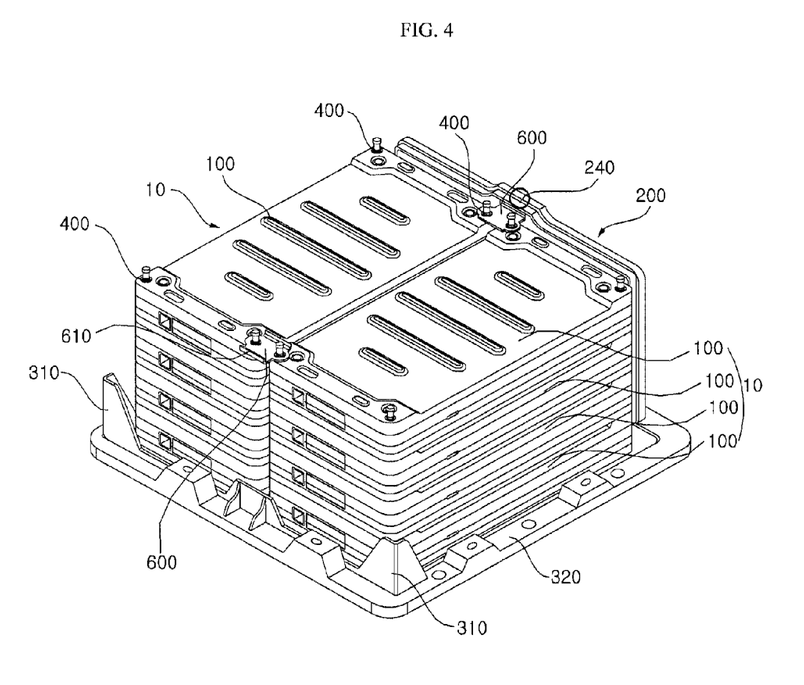
FIG. 4 is a rear perspective view illustrating the battery pack module shown in FIG. 3.

FIG. 2 is an exploded perspective view illustrating a battery pack module including the battery cell module shown in FIG. 1, FIG. 3 is a view illustrating the assembled state of the battery pack module shown in FIG. 2, and FIG. 4 is a rear perspective view illustrating the battery pack module shown in FIG. 3.

Referring to FIGS. 2 to 4, the battery pack module 1000 includes battery cell modules 100 that generate current and is provided with through holes 141c respectively formed at one corner of the battery cell module 100, a battery cartridge module 10 formed by stacking a plurality of battery cell modules 100, a bus bar module 200 provided at one side of the battery cartridge module 10 to connect the battery cell modules 100 to each other, a pack bracket 300 joined to the bus bar module 200, allowing the battery cartridge module 10 to be seated thereon, and provided with a plurality of guides 310 to support the battery cartridge module 10, and a plurality of long bolts 400 inserted into the respective through holes 141c to be fastened to the pack bracket 300 through the battery cell modules 100

The battery cell module 100 includes, as disclosed above, a plurality of unit cells 110 that generate current. Each of the upper cover 141-1 and the lower cover 141-2 of the battery cell module 100 is provided with a plurality of through holes 141c. The through holes 141c are preferably formed at the corners of the battery cell module 100. However, the positions of the through holes 141c are not limited thereto.

Each of the battery cell modules 100 is provided with a parallel positive electrode terminal 117 and/or a parallel negative electrode terminal 119 exposed to one side of the battery cell modules 100. The parallel positive electrode terminals 117 and/or the parallel negative electrode terminals 119 are joined to the bus bar module 200, which will be described later.

A plurality of battery cell modules 100 is stacked to form one battery cartridge module 10. The battery cartridge module 10 may be formed such that the battery cell modules 100 are stacked vertically and/or horizontally. The battery cartridge module 10 is formed by stacking of at least two battery cell modules 100. While the battery cartridge module 10 is illustrated as being formed by stacking of at least four battery cell modules 100, embodiments are not limited thereto.

At least two battery cartridge modules 10 may be provided, and may be disposed vertically and/or horizontally depending on the embodiments. Hereinafter, a description will be given assuming that at least two battery cartridge modules 10 are disposed in parallel on the same plane, but disposition of the battery cartridge modules 10 is not limited thereto.

The bus bar module 200 is joined to a plurality of the battery cartridge modules 10 to electrically connect the battery cell modules 100 to each other. Specifically, the bus bar module 200 includes a bus bar 220 to electrically connect the battery cell modules 100 configuring the battery cartridge modules 10, a bus bar plate 210 provided with a bus bar accommodation groove 213 to accommodate the bus bar 220, and a plate cover 230 joined to the bus bar plate 210 to cover the bus bar 220 accommodated in the bus bar accommodation groove 213.

One side surface of the bus bar plate 210 contacts the battery cartridge modules 10. The bus bar plate 210 is provided with a plurality of terminal openings 211 allowing the parallel positive electrode terminal 117 and/or the parallel negative electrode terminal 119 provided to each of the battery cell module 100 to contact the bus bar 220. The parallel positive electrode terminal 117 and/or the parallel negative electrode terminal 119 are fastened to each of the terminal openings 211, and the bus bar 220 contacts the parallel positive electrode terminal 117 and/or the parallel negative electrode terminal 119 to connect the battery cell modules 100 in parallel and/or in series. The bus bar plate 210 may be formed by an insulating member to prevent short circuit between the battery cell modules 100.

the bus bar accommodation groove 213 to accommodate the bus bar 220 is formed in at least one of the bus bar plate 210 and the plate cover 230. Hereinafter, it will be assumed that the bus bar accommodation groove 213 is formed in the bus bar plate 210. However, the bus bar accommodation groove 213 may be formed in the plate cover 230 depending upon embodiments. The bus bar accommodation groove 213 is recessed to allow the bus bar 220 to be accommodated therein, and is formed in a shape corresponding to that of the bus bar 220.

The bus bar 220 is accommodated in the bus bar accommodation groove 213 and fixed. The bus bar 220 contacts the parallel positive electrode terminal 117 and/or the parallel negative electrode terminal 119, which are fastened to the terminal openings 211 of the bus bar plate 210, thereby connecting the battery cell modules 100 in parallel and/or in series.

The plate cover 230 is formed to correspond to the bus bar plate 210, and covers the bus bar 220 such that the bus bar 220 is not externally exposed. The plate cover 230 covers the bus bar 220 in conjunction with the bus bar plate 210 such that the bus bar 220, along which current flows, is not externally exposed and such that an operator is not electrocuted due to current flowing along the bus bar 220.

The pack bracket 300 is joined to the bus bar module 200. Specifically, a joining protrusion 340 formed on one side of the pack bracket 300 in a protruding fashion is coupled to a joining groove 250 formed on one side of the bus bar module 200 in a recessed fashion. Thereby, the pack bracket 300 and the bus bar module 200 are fixed. The joining groove 250 is formed on one side of the bus bar module 200, and the joining protrusion 340 is formed at a position corresponding to that of the joining groove 250. The joining protrusion 340 may be joined to the joining groove 250 by applying various techniques including welding, bonding, adhesion and fastening via fastening members.

The battery cartridge modules 10 are seated on the pack bracket 300. The pack bracket 300 is provided with a plurality of guides 310 to support the battery cartridge modules 10. The guides 310 may be formed along the periphery of the pack bracket 300. Hereinafter, it will be assumed that the guides 310 are formed at the corners of the pack bracket 300. However, the positions where the guides 310 are formed are not limited thereto.

Each of the guides 310 is formed at one of the corners of the pack bracket 300 to support one corner of each of the battery cartridge modules 10 seated on the pack bracket 300. In addition, the guides 310 may be curved to surround the corners of the battery cartridge modules 10. The guides 310 support the respective corners of the battery cartridge modules 10, thereby allowing the battery cartridge modules 10 seated on the pack bracket 300 to be securely fixed by the guides 310.

As the guides 310 support the respective battery cartridge modules 10, the battery cartridge modules 10 may be protected from damage due to external shock or vibration.

The pack bracket 300 may be divided into a central portion 330 on which the battery cartridge modules 10 are seated in a contacting manner and a peripheral portion 320 around the central portion 330 where the battery cartridge modules 10 are not seated. The peripheral portion 320 may be provided with a plurality of guides 310.

The peripheral portion 320 protrudes more than the central portion 330. Thereby, when the battery cartridge modules 10 are seated on the central portion 330, the inner lateral surface of the peripheral portion 320 contacts and supports the periphery of the battery cartridge modules 10. The peripheral portion 320 protrudes farther upward than the central portion 330, with respect to the ground. Thereby, when the battery cartridge modules 10 are seated on the central portion 330, the peripheral portion 320 covers the periphery of the battery cell modules 100 to a certain degree. The inner lateral surface of the peripheral portion 320 contacts the periphery of the battery cartridge modules 10, thereby supporting the periphery of the battery cartridge module 10 in conjunction with a plurality of the guides 310 such that the battery cartridge modules 10 are correctly seated on and fixed to the pack bracket 300.

The central portion 330 is provided with latticed ribs. Thereby, the central portion 330 may have increased rigidity in supporting the battery cartridge modules 10 seated thereon. The central portion 330 serves to support the battery cartridge modules 10, which are significantly heavy, when the battery cartridge modules 10 are seated thereon. Accordingly, the battery cartridge module 10 needs to have a high rigidity. To increase the rigidity, the central portion 330 is provided with latticed ribs.

The latticed ribs may be formed at a part of the central portion 330 at which the battery cell modules 100 are seated, and may be formed such that the support points on the ribs where the battery cartridge modules 10 are supported are at the same level as the central portion 330. In this case, the part of the central portion 330 where the ribs are formed is recessed with respect to the plane of the central portion 330.

As the latticed ribs are formed in the central portion 330, the rigidity of the central portion 330 that supports the battery cartridge modules 10 may be increased, and damage to the central portion 330 of the pack bracket 300 due to weight of the battery cartridge module 10 may be prevented.

A dividing guide 350 is formed at the center of the pack bracket 300 in a protruding manner. When a centerline of the pack bracket 300 is defined between two battery cartridge modules 10 seated on the same plane of the pack bracket 300, the dividing guide 350 is formed on the centerline in a protruding manner. The dividing guide 350 distinguishes the seating positions of the battery cartridge modules 10 from each other, and is disposed between the battery cartridge modules 10 such that the battery cartridge modules 10 are spaced from each other.

As the battery cartridge modules 10 are spaced from each other by the dividing guide 350, air may flow through the gap between the battery cartridge modules 10, dissipating heat produced in the respective battery cell modules 100 such that the battery cell modules 100 are cooled.

The long bolts 400 are inserted into the through holes 141c. When the battery cell modules 100 are stacked to form one battery cartridge module 10, the through holes 141c formed in each of the battery cell module 100 overlap each other, allowing the long bolts 400 to penetrate therethrough. The long bolts 400 are inserted into the through holes 141c formed in the respective battery cell modules 100, thereby penetrating all of the stacked battery cell modules 100. At this time, the long bolts 400 may penetrate the spacers 124 formed within the battery cell modules 100. The long bolts 400 are formed to have a length sufficient to penetrate one battery cartridge module 10 such that the battery cartridge modules 10 are respectively fastened to the pack bracket 300.

With the battery cartridge modules 10 fastened to the pack bracket 300 by the long bolts 400, the bus bar module 200 provided to the battery cartridge modules 10 is joined to the pack bracket 300. Thereby, one battery pack module 1000 is formed in which respective constituents are securely joined to each other, and accordingly a single module to configure a medium scale or large battery pack may be easily manufactured in less process time.

A bridge bracket 600 to fix the battery cell modules 100 is further provided between the battery cell modules 100 stacked on the top layer of the respective battery cartridge modules 10 disposed on the same plane. One side of the bridge bracket 600 is joined to the battery cell module 100 stacked on the top layer of one of the battery cartridge modules 10. The other side of the bridge bracket 600 is joined to the battery cell module 100 stacked on the top of another one of the battery cartridge modules 10. Herein, the top layer refers to a layer upon which a battery cell module 100 most distant from the pack bracket 300 is stacked, when the battery cell module 100 in contact with the pack bracket 300 forms the lowest layer.

The bridge bracket 600 is connected to the respective battery cell modules 100 stacked on the top layers of the respective battery cartridge modules 10. The bridge bracket 600 fixes the battery cell modules 100 on the top layers together such that the battery cartridge modules 10 form a unit.

In joining the bridge bracket 600 to the battery cell modules 100, the bridge bracket 600 is provided with openings (not shown) to overlap the through holes 141c formed in the battery cell modules 100. With the openings overlapping the through holes 141c, the long bolts 400 are fastened to the pack bracket 300 through the openings and the through holes 141c.

While the one of the openings formed at one side of the bridge bracket 600 overlaps the through holes 141c formed in the battery cell modules 100 stacked on the top layer of one of the battery cartridge modules 10, one of the long bolts 400 is fastened such that the one of the battery cartridge modules 10 is seated on and fixed to the pack bracket 300.

While another one of the openings formed at another side of the bridge bracket 600 overlaps the through hole 141c formed in the battery cell module 100 stacked on the top layer of the other one of the battery cartridge modules 10, the other one of the battery cartridge modules 10 is penetrated by another one of the long bolts 400 to be seated on and fixed to the pack bracket 300.

As the two battery cartridge modules 10 are connected to be one body by the bridge bracket 600, the battery cartridge modules 10 connected to each other and seated on the pack bracket 300 are securely fixed, and respective constituents configure one battery pack module 1000. Thereby, productivity may be enhanced, with reduction of process time in manufacture of the battery pack module 1000.

In addition, the bridge bracket 600 fixes the respective battery cartridge modules 10 and maintains the gap formed between the battery cartridge modules 10 such that air flows through this gap to cool the battery cell modules 100.

Formed at one side of the bus bar module 200 is a protruding portion 240 that protrudes to be joined to the bridge bracket 600. The protruding portion 240 is joined to one side of the bridge bracket 600 to fix the bus bar module 200 to the bridge bracket 600.

A hook 610 formed in a bent manner may be provided at one side of the bridge bracket 600, and a recessed hook accommodation portion (not shown) may be provided in the protruding portion 240 such that the hook 610 may be accommodated in and coupled to the hook accommodation portion.

While joining together the battery cell modules 100 stacked on the top layer of the respective battery cartridge modules 10 disposed on the same plane to join the battery cartridge modules 10 together to form one body, the bridge bracket 600 is joined to the protruding portion 240 of the bus bar module 200. That is, as the hook 610 of the bridge bracket 600 and the protruding portion 240 of the bus bar module 200 are joined to each other, the battery cartridge modules 10 joined to each other to form one unit are joined to the bus bar module 200.

As the bridge bracket 600 integrates the battery cartridge modules 10 with the bus bar module 200, all the battery cartridge modules 10 and the bus bar module 200 seated on the pack bracket 300 may be securely fixed to resist external shock and vibration.

The bus bar module 200 may further include a high-voltage current transfer portion 260 to externally transfer current generated by the battery cartridge module 10. The high-voltage current transfer portion 260 serves to externally transmit, through one positive electrode and one negative electrode, current generated by the respective battery cell modules 100, which are connected to each other by a plurality of bus bars 220. The high-voltage current transfer portion 260 is provided to the bus bar module 200. The high-voltage current transfer portion 260 is provided at one side of the bus bar module 200. A plurality of high-voltage current transfer portions 260 may be provided to form negative electrodes and positive electrodes. In this embodiment, two high-voltage current transfer portions 260 are provided between the bus bar module 200 and the pack bracket 300. However, embodiments of the present invention are not limited thereto.

A seating portion 360 formed in a recessed fashion to allow the high-voltage current transfer portion 260 to be seated thereon is provided at one side of the pack bracket 300. The seating portion 360 is formed at one side of the peripheral portion 320 of the pack bracket 300. The number of the provided seating portions 360 corresponds to that of the high-voltage current transfer portions 260. The seating portion 360 allows the high-voltage current transfer portion 260 to be seated thereon to protect the high-voltage current transfer portion 260 from damage.

Once the high-voltage current transfer portion 260 is seated on the seating portion 360, the part of the high-voltage current transfer portion 260 exposed to be connected to the bus bar module 200 may be prevented from being damaged when the battery pack module 1000 is manufactured.

The pack bracket 300 is further provided with a sensor assembly 500 that is joined to the battery cartridge modules 10 to measure the current and temperature of each of the battery cell modules 100. Connectors (not shown) provided to the sensor assembly 500 are respectively joined to the battery cell modules 100 configuring the battery cartridge module 10. One group of connectors is connected to one battery cartridge module 10. The sensor assembly 500 measures the current and temperature of each of the battery cell modules 100, and transmits the measured data to an external constituent such that malfunction and overheating of the battery cell modules 100 can be detected.

While joined to each of the battery cartridge modules 10, the sensor assembly 500 is joined to the pack bracket 300. The pack bracket 300 may be provided with fastenings grooves (not shown) that allow the sensor assembly 500 to be joined thereto, and the sensor assembly 500 may be provided with fastening members (not shown) that are fastened to the fastening grooves. The fastening members are fastened to the fastening grooves through a fastening member such as a screw. Thereby, the sensor assembly 500 is joined to the pack bracket 300 such that the sensor assembly 500 does not escape from the respective battery cell modules 100.

As the battery cartridge modules 10 and the bus bar 220 form one battery pack module 1000 with the sensor assembly 500 joined to the pack bracket 300, one battery module (not shown) may be easily produced by stacking or connecting a plurality of battery pack modules 1000.

Figure 5:
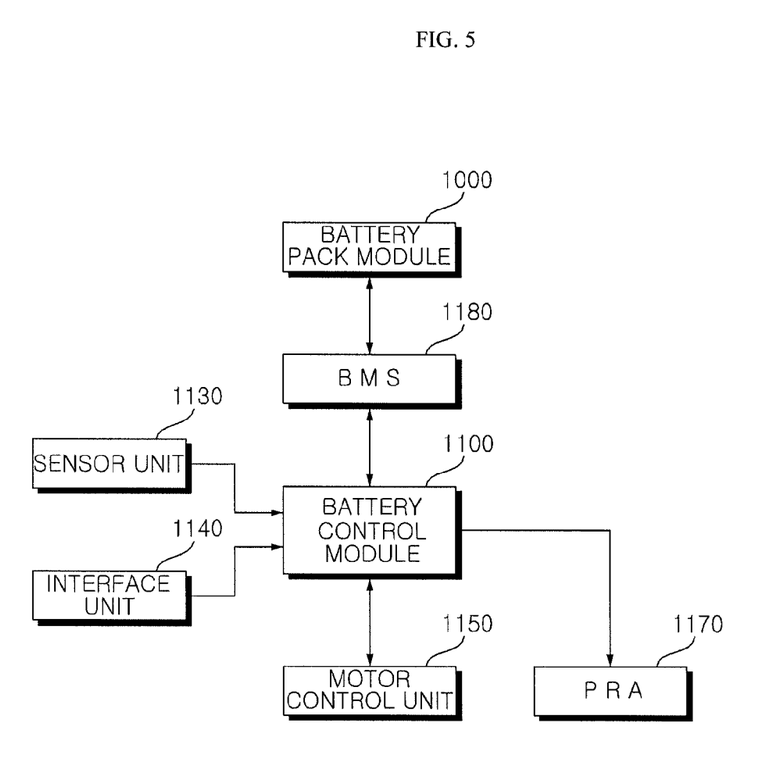
FIG. 5 is a control block diagram illustrating an electric vehicle according to one embodiment of the present invention.

FIG. 5 is a control block diagram illustrating an electric vehicle according to one embodiment of the present invention.

Referring to FIG. 5, the electric vehicle includes a sensor unit 1130, an interface unit 1140, a VCM 1100, a motor control unit 1150, a BMS 1180, a battery pack module 1000, and a PRA 1170.

Since the battery pack module 1000 is illustrated in FIGS. 2 to 4, a detailed description thereof will be omitted.

The sensor unit 1130 senses signals generated during travel of the vehicle or a predetermined operation and outputs the same to the VCM 1100.

The sensor unit 1130 includes a plurality of sensors (not shown) arranged at the interior and exterior of the vehicle, and outputs various signals sensed thereby.

The types of the sensors may vary depending upon installation locations of the sensor, and are not limited.

The sensor unit 1130 may include a wheel sensor to sense the speed of a wheel to calculate torque, a slope sensor to sense the slope of the vehicle, a temperature sensor to sense the exterior temperature, and a humidity sensor to sense humidity.

The interface unit 1140 may include an input means (not shown) manipulated by the driver to input a predetermined signal, and an output means to output information during the current operation.

The input means may include a manipulation means for driving, such as a steering wheel, an accelerator and a brake. Herein, the accelerator outputs information about acceleration necessary for calculation of torque, and the brake outputs information about braking necessary for calculation of the torque.

In addition, the input means includes a plurality of switches and buttons for operation of a turn signal lamp, a tail lamp, a headlamp and a brush according to driving of the vehicle.

The output means includes a display unit to display information, a speaker to output music, sound effects and a warning sound, and various state indicating lamps.

The battery pack module 1000 is configured with a plurality of battery cell modules 100 and stores high-voltage electric energy.

The battery management system (BMS) 1180 determines the remaining capacity and necessity of recharge of the battery pack module 1000, and performs management operation related to supply of current stored in the battery pack module 1000 to each part of the electric vehicle.

At this time, the BMS 1180 maintains a uniform difference in voltage between the cells in the battery in recharging and use of the battery such that the battery is not excessively recharged or discharged, thereby extending the lifespan of the battery.

The BMS 1180 measures the current voltage of the battery pack module 1000 and outputs the same to the VCM 1100.

The BMS 1180 may include an AC-DC converter (not shown) to covert the input AC power into DC power and a control unit (not shown) to control the AC-DC converter.

The motor control unit (MCU) 1150, which produces a control signal to drive a motor (not shown), produces and applies a predetermined signal for control of the motor.

At this time, the motor control unit 1150 that produces a control signal for driving of the motor includes an inverter (not shown) and a convertor (not shown), and thus may control the inverter or the converter to control driving of the motor 1160.

The motor control unit 1150 may calculate the value of torque based on various input values to cause the motor to produce torque having the calculated torque value.

The vehicle control module (VCM) 1100 may control overall operations of the vehicle including driving.

The VCM 1100 may control the motor control unit 1150 by producing and applying a predetermined command to the motor control unit 1150 such that set operations corresponding to the inputs from the interface unit 1140 and the sensor unit 1130 are performed, and may also control input and output of data.

In addition, the VCM 1100 may manage the battery pack module 1000 through the BMS 1180 and apply a switching signal to a PRA 1170 to control supply of electric power to the motor control unit 1150.

Depending on settings, the VCM 1100 may be set to an economy (ECO) mode in which driving is performed in an energy saving manner or may generate a value for control of torque to perform ESC (electronic stability control) of autonomously controlling the stability of the vehicle.

The PRA (power relay assembly) 1170 may perform the switching operation such that power from the battery pack module 1000 is supplied to the motor control unit 1150.

The PRA 1170 may includes a plurality of relays to switch a high voltage and a sensor, thereby applying or cutting off the high-voltage operational power from the battery pack module 1000 to the motor control unit 1150.

Figure 6:
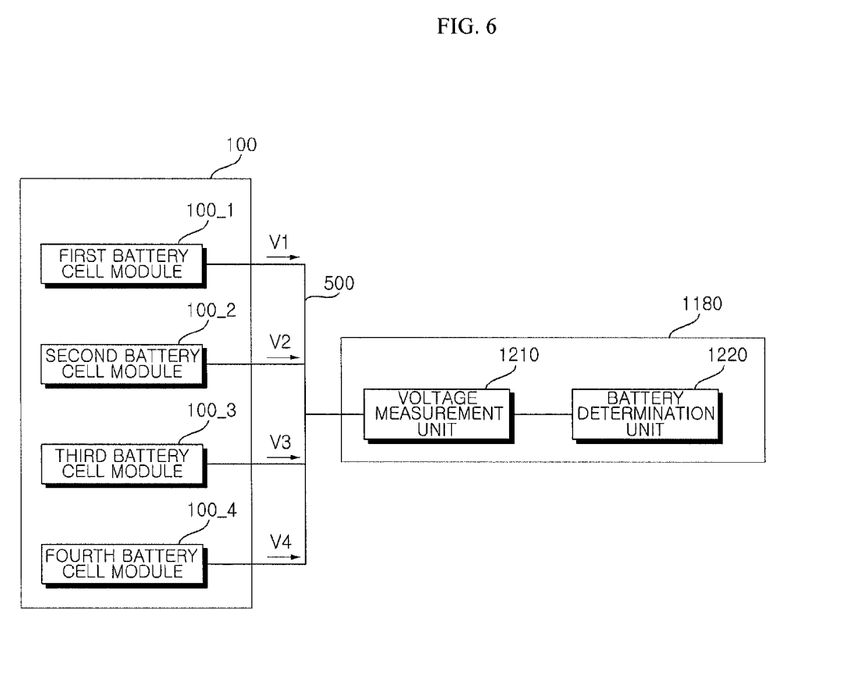
FIG. 6 is a control block diagram illustrating a battery management system shown in FIG. 5.
Figure 7:
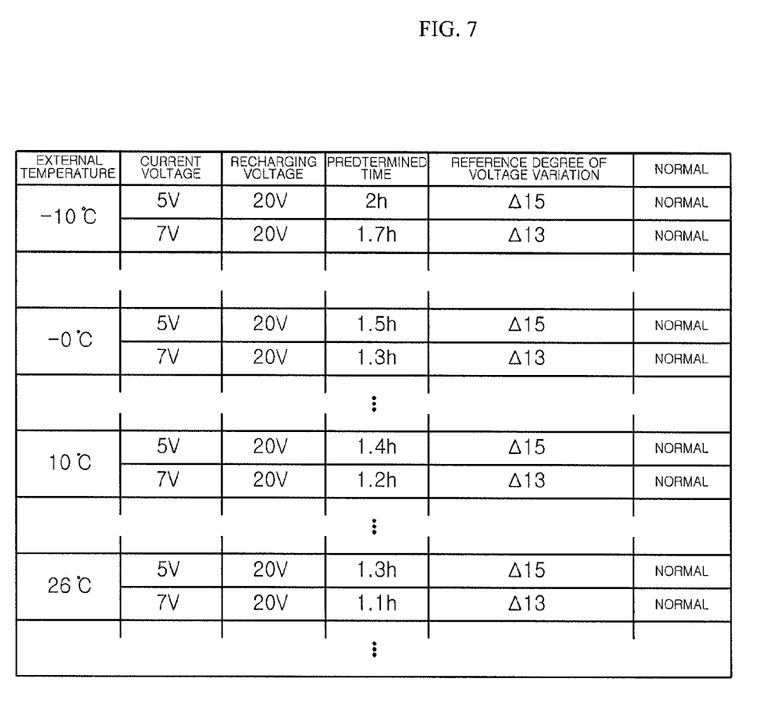
FIG. 7 is a view showing a lookup table set in the battery management system shown in FIG. 6.

FIG. 6 is a control block diagram illustrating the BMS shown in FIG. 5, and FIG. 7 is a view showing a lookup table set in the BMS shown in FIG. 6.

Referring to FIGS. 6 and 7, the BMS 1180 includes a voltage measurement unit 1210 to measure first to fourth current voltages v1 to v4 of first to fourth battery cell modules 1001 to 100_4 included in the battery pack module 1000, and a battery determination unit 1220 to determine time for recharging of the battery pack module 1000 according to the set lookup table based on the first to fourth current voltages v1 to v4, measured by the voltage measurement unit 1210, and the external temperature, measured by the sensor unit 1130 and to determine abnormality of each of the first to fourth battery cell modules 100_1 to 100_4 once recharging is completed.

Herein, the external temperature may be temperatures of the first to fourth battery cell modules 100_1 to 100_4, but embodiments are not limited thereto.

The voltage measurement unit 1210 measures the first to fourth current voltages v1 to v4 through the sensor assembly 500 connected to each of the first to fourth battery cell modules 100_1 to 100_4.

Herein, the sensor assembly 500 may measure the recharging voltage of the battery pack module 1000 as shown in FIG. 2, and may also measure the recharging voltage of each of the first to fourth battery cell modules 100_1 to 100_4.

Herein, the voltage measurement unit 1210 transmits the first to fourth current voltages v1 to v4 as measured to the battery determination unit 1220.

The battery determination unit 1220 determines abnormality of each of the first to fourth battery cell modules 100_1 to 100_4 according to a lookup table set based on the first to fourth current voltages v1 to v4 and the external temperature as input thereto.

An example will be given with reference to the lookup table shown in FIG. 7.

Referring to the lookup table shown in FIG. 7, the first to fourth current voltages v1 to v4 of the first to fourth battery cell modules 100_1 to 100_4 prior to start of recharge of the battery pack module 1000 are assumed to be 5V and 7V at external temperatures of −10° C., 0° C., 10° C. and 26° C., and a predetermined time taken for the recharging voltage to reach 20 V to complete recharging and a reference degree of voltage variation are set. If the degree of voltage variation is less than the reference degree of voltage variation, this indicates that the module is in normal state.

That is, in the case that the battery pack module 1000 is recharged at the external temperature of 26° C. and the first to fourth current voltages v1 to v4 are all assumed to be 5 V, recharging is performed for a predetermined time of 1.3 hours according to the lookup table shown in Table 1. Then, the recharging voltages of the first to fourth current voltages v1 to v4 are 20V, the degree of voltage variation from the first to fourth current voltages v1 to v4 to the recharging voltage is Δ15, and the reference degree of voltage variation is Δ15. Accordingly, the battery determination unit 1220 may determine that all of the first to fourth battery cell modules 100_1 to 100_4 are functioning normally.

In addition, in the case that the degree of voltage variation is Δ13 after recharging of the first battery cell module 100_1 of the first to fourth battery cell modules 100_1 to 100_4 for a predetermined time of 1.3 hours according to the lookup table, the first battery cell module 100_1 may be determined to be normal since the reference degree of voltage variation is less than Δ15.

If the degree of voltage variation is equal to or greater than the reference degree of voltage variation, the first battery cell module 100_1 of the first to fourth battery cell modules 100_1 to 100_4 may be determined to be abnormal.

By calculating the degree of voltage variation through comparison of the current voltage of each of the first to fourth battery cell modules 100_1 to 100_4 prior to recharging with the recharging voltage obtained after recharging, only the abnormal battery cell module needs be replaced among the first to fourth battery cell modules 100_1 to 100_4.

Figure 8:
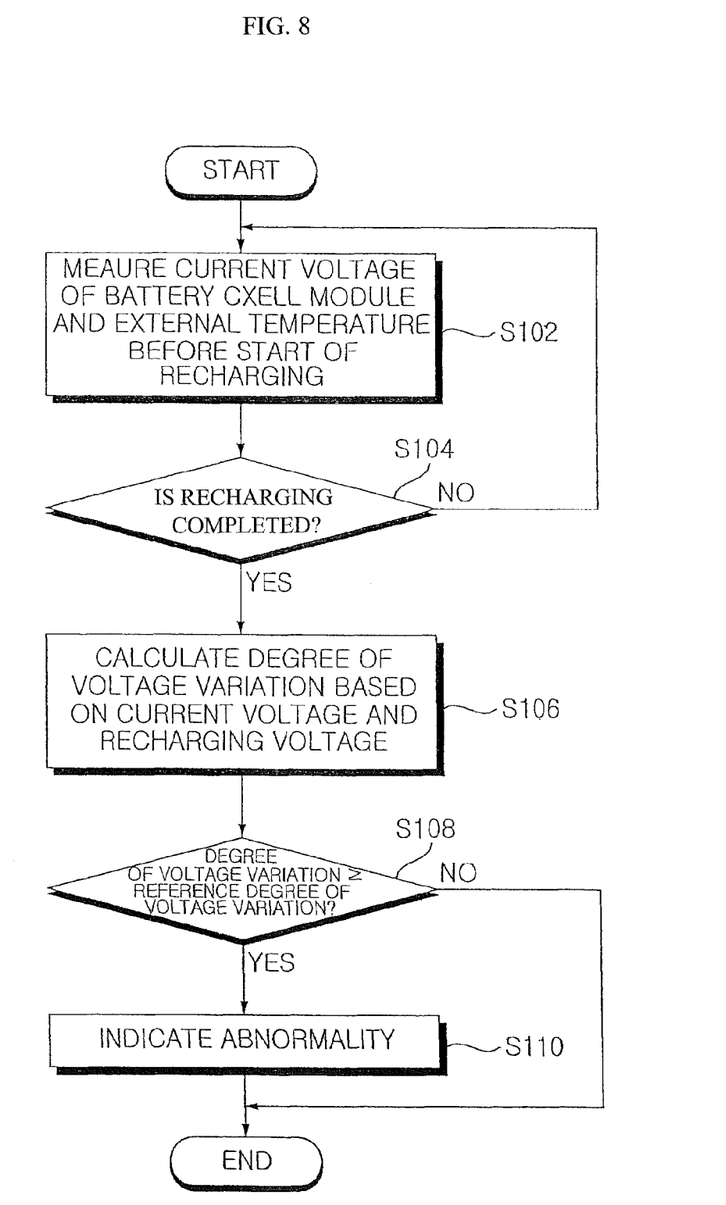
FIG. 8 is a flowchart illustrating a control method for an electric vehicle according to one embodiment of the present invention.

FIG. 8 is a flowchart illustrating a control method for an electric vehicle according to one embodiment of the present invention.

Referring to FIG. 8, immediately before or after a start of recharging, the current voltage of a battery cell module including at least two unit cells and the external temperature are measured (S102).

That is, the BMS 1180 receives the measured current voltages of the battery cell module 100 from the sensor assembly 500 which is connected to a plurality of the battery cell modules 100 included in the battery pack module 1000, and receives the measured external temperature from the sensor unit 1130.

Once a predetermined time elapses after start of recharging, recharging voltage of the battery cell module is measured and whether recharging is completed is determined (S 104).

That is, the BMS 1180 performs recharging for a predetermined time set in the lookup table according to the external temperature and current voltage.

When the predetermined time elapses, the BMS 1180 measures the recharging voltages of the battery cell modules 100. In the case that the recharging voltages are equal to or greater than the recharging voltage set in the lookup table, it is determined that recharging is completed. In the case that the recharging voltages are less than the set recharging voltage, recharging is performed again.

In the case that recharging is performed again after the predetermined time elapses, the BMS 1180 may re-perform recharging for a time shorter than the predetermined time, but embodiments are not limited thereto.

While the predetermined time is described in this embodiment as being set in the lookup table, the predetermined time may not be set, and whether recharging is completed may be determined through the recharging voltage. However, embodiments are not limited thereto.

Once recharging is completed, the degree of voltage variation is calculated based on the current voltage and the recharging voltage (S 106), abnormality of the battery cell module is determined based on the degree of voltage variation and the reference degree of voltage variation set in the lookup table (S108), and when the battery cell module is abnormal, an indication of such abnormality is displayed (S 110).

That is, the BMS 1180 calculates the degree of voltage variation representing the difference in voltage between the current voltages of the battery cell modules 100 and the recharging voltages, and compares the degree of voltage variation with the reference degree of voltage variation set in the lookup table.

At this time, in the case that the degree of voltage variation is equal to or greater than the reference degree of voltage variation, the BMS 1180 determines that the battery cell modules 100 are normal. In the case that the degree of voltage variation is less than the reference degree of voltage variation, the BMS 1180 determines that the battery cell module 100 is abnormal.

In addition, in the case that the battery cell module 100 is abnormal, the BMS 1180 displays an indication of abnormality on the output device.

Herein, while the output device is illustrated as being a display device that displays abnormality of the battery cell modules 100, the output device may be an alarm device that produces an alarm sound or a buzzer sound. Embodiments are not limited thereto.

Although the preferred embodiments of the present invention have been disclosed for illustrative purposes, the present invention is not limited to the disclosed embodiments. Those skilled in the art will appreciate that various modifications, additions and substitutions are possible, without departing from the scope and spirit of the invention as disclosed in the accompanying claims.

The invention claimed is:

1. A control method for an electric vehicle comprising the steps of:
measuring, via a sensor assembly, a first voltage of each of a plurality of battery cell modules and an external temperature before a start of recharging of the plurality of battery cell modules;
determining whether recharging is completed by measuring a recharge voltage of the plurality of battery cell modules after recharging is performed for a predetermined time set by the first voltage and the external temperature;
calculating, when it is determined that recharging is completed, a degree of voltage variation based on the first voltage and the recharging voltage, and determining whether or not at least one of the plurality of battery cell modules is abnormal based on the degree of voltage variation and a set reference degree of voltage variation; and
performing a management operation related to supply of electric energy in the plurality of battery cell modules to each part of the electric vehicle based on a determination that the plurality of battery cell modules are in a normal state,
wherein the set reference degree of voltage variation is determined based on the external temperature.

2. The control method according to claim 1, wherein, in the step of determining whether recharging is completed, it is determined that recharging is completed when the recharging voltage is within a predetermined range of recharge completion voltage.

3. The control method according to claim 2, wherein the predetermined time is a time preset for recharge from the first voltage to the recharging voltage.

4. The control method according to claim 1, wherein the degree of voltage variation is a voltage difference between the first voltage and the recharging voltage.

5. The control method according to claim 1, wherein the reference degree of voltage variation is a reference voltage difference between the first voltage and the recharging voltage preset based on the external temperature.

6. The control method according to claim 1, wherein, in the step of determining whether or not at least one of the plurality of battery cell modules is abnormal, it is determined that the plurality of battery cell modules are normal when the degree of voltage variation is less than the reference degree of voltage variation, or
that at least one of the plurality of battery cell modules is abnormal when the degree of voltage variation is equal to or greater than the reference degree of voltage variation.

7. The control method according to claim 1, further comprising the step of indicating whether or not at least one of the plurality of battery cell modules is abnormal.

8. The control method according to claim 7, wherein, in the indicating step, an indication of whether or not at least one of the plurality of battery cell modules is abnormal is displayed, or
an alarm sound indicating whether or not at least one of the plurality of battery cell modules is abnormal is generated.

9. The control method according to claim 8, wherein, in the indicating step, an indication of whether or not at least one of the plurality of battery cell modules is abnormal is displayed.

10. The control method according to claim 8, wherein, in the indicating step, an alarm sound indicating whether or not at least one of the plurality of battery cell modules is abnormal is generated.

11. The control method according to claim 1, wherein the set reference degree of voltage variation is determined by referencing a lookup table of voltage variations using the external temperature.

12. An electric vehicle comprising:
a plurality of battery cell modules;
a sensor assembly configured to measure a first voltage of each of a plurality of battery cell modules and an external temperature before a start of recharging of the plurality of battery cell modules;
a battery control module configured to:
   determine whether recharging is completed by measuring a recharge voltage of the plurality of battery cell modules after recharging is performed for a predetermined time set by the first voltage and the external temperature;
   calculate, when it is determined that recharging is completed, a degree of voltage variation based on the first voltage and the recharging voltage, and determine whether or not at least one of the plurality of battery cell modules is abnormal based on the degree of voltage variation and a set reference degree of voltage variation; and
   perform a management operation related to supply of electric energy in the plurality of battery cell modules to each part of the electric vehicle based on a determination that the plurality of battery cell modules are in a normal state,
wherein the set reference degree of voltage variation is determined based on the external temperature.

13. The electric vehicle according to claim 12, wherein the battery control module is configured to determine that recharging is completed when the recharging voltage is within a predetermined range of recharge completion voltage.

14. The electric vehicle according to claim 13, wherein the predetermined time is a time preset for recharge from the first voltage to the recharging voltage.

15. The electric vehicle according to claim 12, wherein the degree of voltage variation is a voltage difference between the first voltage and the recharging voltage.

16. The electric vehicle according to claim 12, wherein the reference degree of voltage variation is a reference voltage difference between the first voltage and the recharging voltage preset based on the external temperature.

17. The electric vehicle according to claim 12, wherein the battery control module is configured to determine that the plurality of battery cell modules are normal when the degree of voltage variation is less than the reference degree of voltage variation, or
   that at least one of the plurality of battery cell modules is abnormal when the degree of voltage variation is equal to or greater than the reference degree of voltage variation.

18. The electric vehicle according to claim 12, wherein the battery control module is configured to indicate whether or not at least one of the plurality of battery cell modules is abnormal.

19. The electric vehicle according to claim 18, wherein the battery control module is configured to display an indication of whether or not at least one of the plurality of battery cell modules is abnormal is displayed, or
   output an alarm sound indicating whether or not at least one of the plurality of battery cell modules is abnormal is generated.

20. The electric vehicle according to claim 12, wherein the set reference degree of voltage variation is determined by referencing a lookup table of voltage variations using the external temperature.

* * * * *